United States Patent
Kang (10) Patent No.: US 10,152,640 B2
(45) Date of Patent: Dec. 11, 2018

(54) SYSTEM AND METHOD FOR VERIFICATION OF LAMP OPERATION

(71) Applicant: Mando Corporation, Pyeongtaek-si, Gyeonggi-do (KR)

(72) Inventor: Yong Gyu Kang, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 51 days.

(21) Appl. No.: 15/490,019

(22) Filed: Apr. 18, 2017

(65) Prior Publication Data

US 2017/0300766 A1    Oct. 19, 2017

(30) Foreign Application Priority Data

Apr. 19, 2016    (KR) .................. 10-2016-0047643

(51) Int. Cl.
| | |
|---|---|
| H04N 7/18 | (2006.01) |
| G06K 9/00 | (2006.01) |
| B60Q 1/00 | (2006.01) |
| G06K 9/46 | (2006.01) |

(52) U.S. Cl.
CPC ....... G06K 9/00825 (2013.01); B60Q 1/0023 (2013.01); G06K 9/4661 (2013.01)

(58) Field of Classification Search
CPC . G06K 9/00825; G06K 9/4661; B60Q 1/0023
USPC ........ 348/148, 149, 151, 152, 153, 161, 143
See application file for complete search history.

(56) References Cited

U.S. PATENT DOCUMENTS

| | | | |
|---|---|---|---|
| 7,395,138 B2* | 7/2008 | Kondoh | B60K 26/021 701/1 |
| 8,830,324 B2* | 9/2014 | Endo | B60Q 1/0023 348/149 |
| 9,649,972 B2* | 5/2017 | Kato | B60Q 9/008 |
| 9,826,200 B2* | 11/2017 | Stein | G06K 9/00805 |
| 2002/0157033 A1 | 10/2002 | Cox | |

FOREIGN PATENT DOCUMENTS

| | | |
|---|---|---|
| DE | 10 2005 010 671 A1 | 9/2006 |
| DE | 10 2013 015 718 A1 | 3/2015 |
| DE | 10 2013 110 840 A1 | 4/2015 |

(Continued)

OTHER PUBLICATIONS

Korean Office Action dated Feb. 28, 2017 corresponding to Korean Application No. KR 10-2016-0047643, citing the above reference(s).

(Continued)

*Primary Examiner* — Robert Chevalier
(74) *Attorney, Agent, or Firm* — Hauptman Ham, LLP (57) ABSTRACT

According to the present invention, a system for verifying a lamp operation includes: a camera for acquiring an image around the vehicle; and an image processor for determining whether the lamp is broken based on the image acquired by the camera, in which the image processor receives a turn on state of the lamp through internal communication of the vehicle connected to the lamp and is operated in synchronization with timing at which the lamp is turned on and the image processor determines whether the lamp is broken by comparing images before and after the lamp is turned on if it is determined that the lamp is turned on.

15 Claims, 6 Drawing Sheets

(56) References Cited

FOREIGN PATENT DOCUMENTS

| | | |
|---|---|---|
| DE | 10 2015 214 332 A1 | 2/2017 |
| JP | 2010-006249 A | 1/2010 |
| JP | 2010-137757 A | 6/2010 |
| JP | 2012-126228 A | 7/2012 |
| JP | 2013-032123 A | 2/2013 |
| WO | 2017/016557 A1 | 2/2017 |

OTHER PUBLICATIONS

German Office Action dated Oct. 6, 2017 in connection with the counterpart German Patent Application No. 10 2017 206 511.7, citing the above reference(s).

* cited by examiner

SYSTEM AND METHOD FOR VERIFICATION OF LAMP OPERATION

CROSS-REFERENCE TO RELATED APPLICATION

This application claims priority to Korean Patent Application No. 10-2016-0047643, filed on Apr. 19, 2016, the disclosure of which is incorporated herein by reference in its entirety.

BACKGROUND OF THE INVENTION

Field of the Invention

Exemplary embodiments of the present invention relate to a system and a method for verification of a lamp operation, and more particularly, to a determination on a state of a head lamp and a tail lamp of a vehicle using an around view camera. That is, the present invention relates to a system and a method for verification of a lamp operation capable of displaying a failure state of a head lamp and a tail lamp of a vehicle to a user upon verification of the failure state of the head lamp and the tail lamp of the vehicle using an around view camera.

Description of the Related Art

Generally, a vehicle is provided with a plurality of lamps for securing a driver's vision or for safe operation of the following vehicle.

In addition, a driver may appropriately turn on a lamp according to the current surrounding environment to secure a driver's vision and may inform the position of the following vehicle of his or her own vehicle position, or the like to promote safe driving.

However, the existing vehicle has a disadvantage in that there is no method for displaying short-circuit of an installed lamp, i.e., high/low head lamps, braking, or the like and therefore driver's recognition is slow, which may affect safe driving of a driver own vehicle and the following vehicle.

In addition, since a failure of a head lamp and a tail lamp of a vehicle may be determined only by a regular check-up of an owner driver or drivers of other vehicles, it is difficult to determine the failure of the head lamp and the tail lamp. Therefore, efforts to improve the problem have been conducted.

For example, the related art proposes a method for detecting whether a tail lamp of a vehicle is normally operated based on an image of a camera, by photographing a vehicle entering a highway tollgate with a camera installed at the rear of the highway tollgate, extracting a vehicle object using a background and foreground separating technique, determining whether the tail lamp is normally operated by separating a candidate area of the tail lamp of the corresponding vehicle, and then notifying a vehicle driver of the determination result through an electric bulletin board or the like installed at the front of the highway tollgate.

However, there is a problem in that it is difficult to ascertain whether the tail lamp is normally operated and the driver may not directly determine whether the tail lamp is normally operated, in areas outside the highway.

SUMMARY OF THE INVENTION

An object of the present invention is to a system and a method for verification of a lamp operation capable of determining a state of a head lamp and a tail lamp of a vehicle using an around view camera.

Another object of the present invention is to provide a system and a method for verification of a lamp operation capable of allowing a user to easily recognize a failure of a head lamp and a tail lamp by displaying a failure state of the head lamp and the tail lamp to the user upon the verification of the failure state of the head lamp and the tail lamp of the vehicle using an around view camera.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a system for verification of a lamp operation determining whether a lamp illuminating a front or a rear of a vehicle is broken includes: a camera for acquiring an image around the vehicle; and an image processor for determining whether the lamp for illuminating the front or the rear of the vehicle is broken based on the image acquired by the camera, in which the image processor may receive a turn on state of the lamp through internal communication of the vehicle connected to the lamp and may be operated in synchronization with timing at which the lamp is turned on and the image processor may determine whether the lamp is broken by comparing images before and after the lamp is turned on if it is determined that the lamp is turned on.

The image processor may compare the images before and after the lamp is turned on to determine that the lamp is broken if a difference in brightness of areas illuminated by the lamp is equal to or less than a predetermined range.

The system may further include: a failure display unit for notifying a user of a result of the image processor.

The image processor may include: a lamp state verifier for verifying a lamp state; a daytime/nighttime determiner for determining daytime and nighttime; and a lamp failure determiner for determining the failure of the lamp based on the image acquired by the camera.

The image processor may determine whether a pair of bisymmetrical lamps is broken based on whether brightness of an area to which the pair of bisymmetrical lamps is illuminated is symmetrical, among the images acquired by the camera, if it is determined that the pair of bisymmetrical lamps is turned on.

The daytime/nighttime determiner may determine the daytime/nighttime on the basis of at least one of the internal communication of the vehicle connected to a daytime/nighttime sensor and/or the determination based on the image acquired by the camera.

All the lamps of the vehicle may be turned on using different frequencies, and the image processor may simultaneously determine whether each of all the lamps is broken based on the image acquired by the camera, in synchronization with timing at which each of all the lamps is turned on at each of the different frequencies through the internal communication of the vehicle.

The image processor may determine whether the lamp is broken based on an image illuminated at a predetermined frequency, in synchronization with timing at which the lamp is turned on at a predetermined frequency.

In accordance with another aspect of the present invention, a method for verification of a lamp operation determining whether a lamp illuminating a front or a rear of a vehicle is broken includes: camera recognizing step of acquiring an image around a vehicle; and an image processing step of detecting whether the lamp for illuminating a front or a rear of the vehicle is broken based on the image acquired in the camera recognizing step, in which the image processing step may be performed in synchronization with timing at which the lamp is turned on, by receiving a turn on state of the lamp through the internal communication of the vehicle connected to the lamp, and the image processing step may be performed to determine whether the lamp is broken by comparing images before and after the lamp is turned on if it is determined that the lamp is turned on.

The image processing step may compare the images before and after the lamp is turned on to determine that the lamp is broken if a difference in brightness of areas illuminated by the lamp is equal to or less than a predetermined range.

All the lamps of the vehicle may be turned on using different frequencies, respectively, and the image processing step may simultaneously detect whether each of all the lamps is broken based on the image acquired in the camera recognizing step, in synchronization with timing at which each of all the lamps is turned on at each of the different frequencies through the internal communication of the vehicle.

The method may further include: a lamp failure verifying step of verifying the failure of the lamp based on a result of the image processing step; and a failure displaying step of displaying the failure of the lamp to a user through a failure display unit if it is determined in the lamp failure verifying step that the lamp is broken.

The image processing step may include: a lamp turn on verifying step of verifying a lamp state; a nighttime verifying step of determining daytime and nighttime; and a lamp failure determining step of determining the failure of the lamp based on the image acquired by the camera.

The image processing step may be performed to determine whether a pair of bisymmetrical lamps is broken based on whether brightness of an area to which the pair of bisymmetrical lamps is illuminated is symmetrical, among the images acquired by the camera, if it is determined that the pair of bisymmetrical lamps is turned on.

The nighttime verifying step may include: an image information receiving step of receiving an image acquired by the camera; a daytime/nighttime determining step of determining nighttime from the image; and a nighttime determination verifying step of verifying whether it is nighttime in the daytime/nighttime determining step.

According to the embodiment of the present invention, the system and method for verification of a lamp operation may determine the state of the head lamp and the tail lamp of the vehicle using the around view camera.

Further, according to the embodiment of the present invention, the system and method for verification of a lamp operation may allow the user to easily recognize the failure of the head lamp and the tail lamp by displaying the failure state of the head lamp and the tail lamp to the user upon the verification of the failure state of the head lamp and the tail lamp of the vehicle using the around view camera.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a graph showing timing at which a lamp of FIG. 1 is turned on;

DESCRIPTION OF SPECIFIC EMBODIMENTS

Detailed exemplary embodiments of the present invention will be described with reference to the accompanying drawings.

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention.

Hereinafter, a system and a method for verification of a lamp operation according to exemplary embodiments of the present invention will be described in detail with reference to the accompanying drawings.

Figure 1:
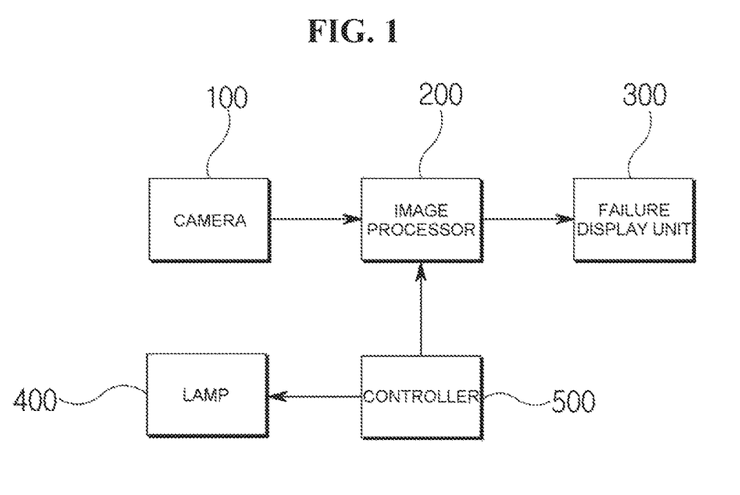
FIG. 1 is a configuration diagram illustrating a system for verification of a lamp operation according to an embodiment of the present invention.

FIG. 1 is a configuration diagram illustrating a system for verification of a lamp operation according to an embodiment of the present invention and FIGS. 2 to 5 are a configuration diagram, a photograph, and a graph for explaining FIG. 1 in detail.

Hereinafter, the system for verification of a lamp operation according to the embodiment of the present invention will be described with reference to FIGS. 1 to 5.

Referring first to FIG. 1, the system for verification of a lamp operation according to the embodiment of the present invention includes a camera 100 for acquiring images around a vehicle and an image processor 200 for determining whether a lamp 400 for illuminating a front or a rear of the vehicle is broken based on images acquired by the camera 100.

The image processor 200 receives a turn on state of the lamp 400 through internal communications of the vehicle connected to the lamp 400, and is operated in synchronization with the timing at which the lamp 400 is turned on.

If it is determined that the lamp 400 is turned on, the image processor 200 determines whether the lamp 400 is broken by comparing images before and after the lamp is turned on.

The image processor 200 may compare images before and after the lamp 400 is turned on to determine that the lamp 400 is broken if a difference in brightness of areas illuminated by the lamp 400 is equal to or less than a predetermined range.

The system for verification of a lamp operation may include a failure display unit 300 for notifying a user of the result of the image processor 200.

Further, the system for verification of a lamp operation may include a controller 500 that controls the lamp 400 and transmits the control result to the image processor 200.

That is, the controller 500 controls the lamp 400 to be turned on/off and notifies the image processor 200 of a control time, and the image processor 200 analyzes images around the vehicle that are acquired by the camera 100 to analyze whether the lamps 400 are broken and displays whether the lamps 400 are broken to the user through the failure display unit 300 if it is verified that the lamp 400 is broken, such that the user may easily recognize the failure of the head lamp and the tail lamp.

At this point, the controller 500 may turn on/off each of the lamps 400 at each of predetermined frequencies, and may simultaneously analyze whether any one of the lamps 400 is broken using different frequencies depending on a left head lamp, a right head lamp, a left tail lamp, and a right tail lamp.

Here, the head lamp may include a fog lamp and a turn signal lamp that are attached to a front surface of the vehicle.

In addition, the tail lamp may include a brake lamp, a turn signal lamp, a back lamp, etc., that are attached to the front surface of the vehicle.

Further, the controller 500 controls a pair of bisymmetrical lamps among the lamps 400, for example, left and right head lamps or left and right tail lamps to be simultaneously turned on and the image processor 200 may also analyze the images around the vehicle that are acquired by the camera 100 to analyze whether the lamp 400 is broken based on whether the brightness of areas to which the pair of lamps are illuminated is symmetrical.

Figure 2:
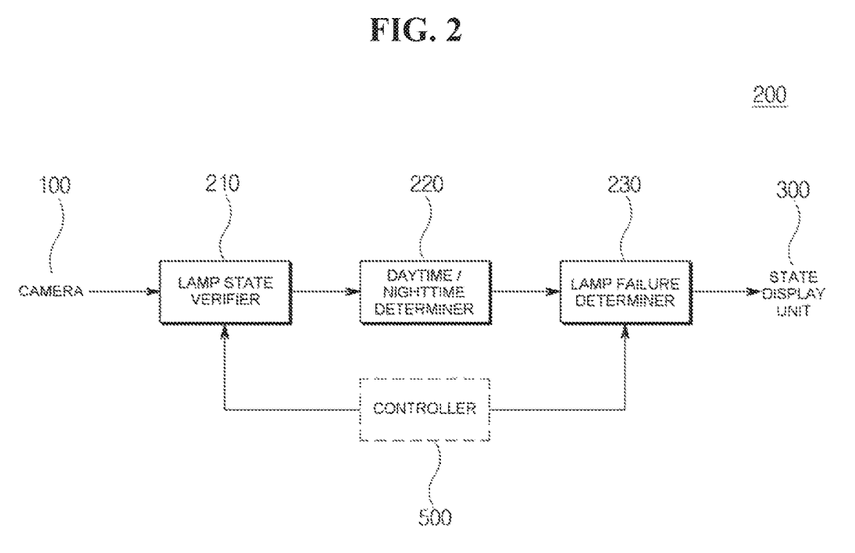
FIG. 2 is a configuration diagram showing in detail an image processor of FIG. 1.

FIG. 2 is a configuration diagram showing in detail the image processor 200 of FIG. 1. At this point, the image processor 200 includes a lamp state verifier 210 for verifying a lamp state, a daytime/nighttime determiner 220 for determining the daytime and nighttime, and a lamp failure determiner 230 for determining the failure of the lamp 400 based on the image acquired by the camera 100.

Further, the lamp state verifier 210 may verify whether the lamp is turned on based on at least one of the internal communication of the vehicle connected to the lamp 400, the transmission of the result of controlling the lamp 400 by the controller 500, and the determination based on the image acquired by the camera 100.

Here, the daytime/nighttime determiner 220 may determine the daytime/nighttime on the basis of at least one of the internal communication of the vehicle connected to a daytime/nighttime sensor and/or the determination based on the image acquired by the camera 100.

That is, the lamp failure determiner 230 may also determine that the lamp is broken only when the lamp state verifier 210 determines that the lamp 400 is turned on and the daytime/nighttime determiner 220 determines that it is night.

The turn on state of the lamp 400 may be received from the internal communication of the vehicle such as a car area network (CAN), may be determined based on the image acquired by the camera 100, and may be determined by the controller 500 receiving a signal controlling the lamp 400.

In addition, the daytime/nighttime determination may be made by the internal communication of the vehicle using the daytime/nighttime sensor and may be made based on the image acquired by the camera 100.

Figure 3:
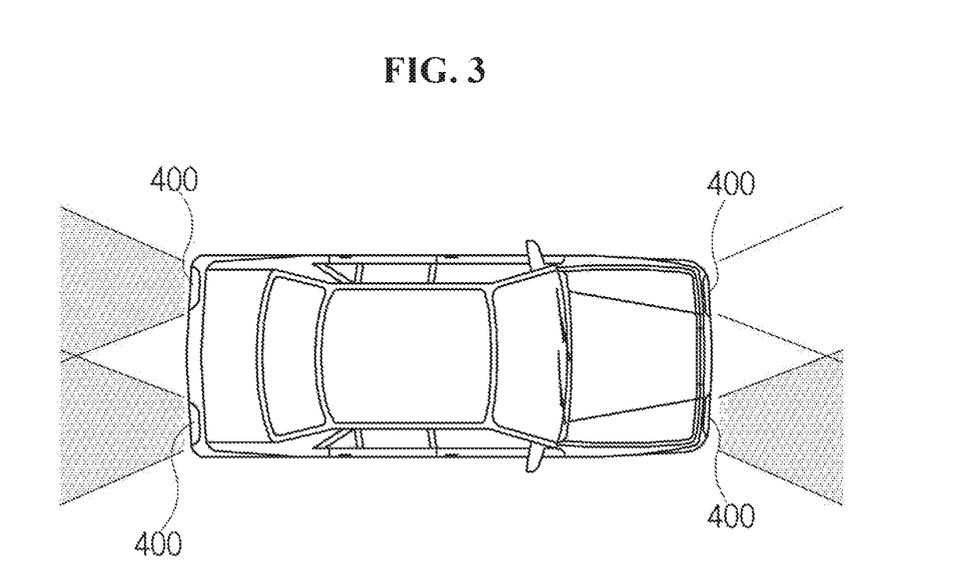
FIG. 3 is a photograph of images outside a vehicle collected by a camera of FIG. 1.

FIG. 3 is a photograph of images outside a vehicle collected by the camera 100 of FIG. 1.

FIG. 3 illustrates the case where the left head lamp among the head lamps and the tail lamps of the vehicle malfunctions.

At this time, the system for verification of a lamp operation acquires an image from the camera 100, verifies whether the lamp is turned on using the lamp state verifier 210, and determines that it is nighttime using the daytime/nighttime determiner 220, such that the lamp failure determiner 230 may determine the failure of the lamp 400.

Meanwhile, it is difficult to analyze the image related to the turn on of the lamp 400 from the image acquired by the camera 100 in the daytime, but the image may be easily analyzed using a predetermined frequency when the lamp is turned on.

Figure 4:
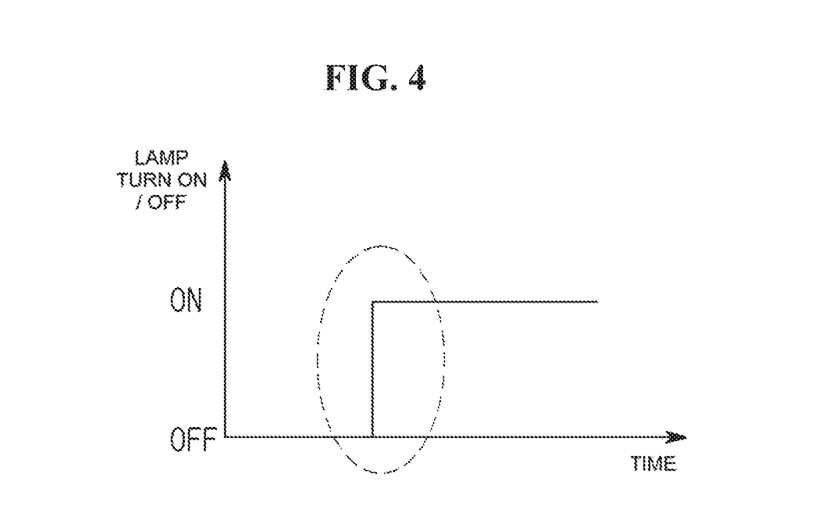

FIG. 4 is a graph showing timing at which the lamp 400 of FIG. 1 is turned on. At this point, the image processor 200 may determine whether the lamp 400 is broken by comparing the images before and after the lamp 400 is turned on, in synchronization with the timing at which the lamp 400 is turned on.

The image processor 200 may determine whether the lamp 400 is broken even using the image after the lamp 400 is turned on but may more reliably determine whether the lamp 400 is broken by comparing the images before and after the lamp 400 is turned on.

Figure 5:
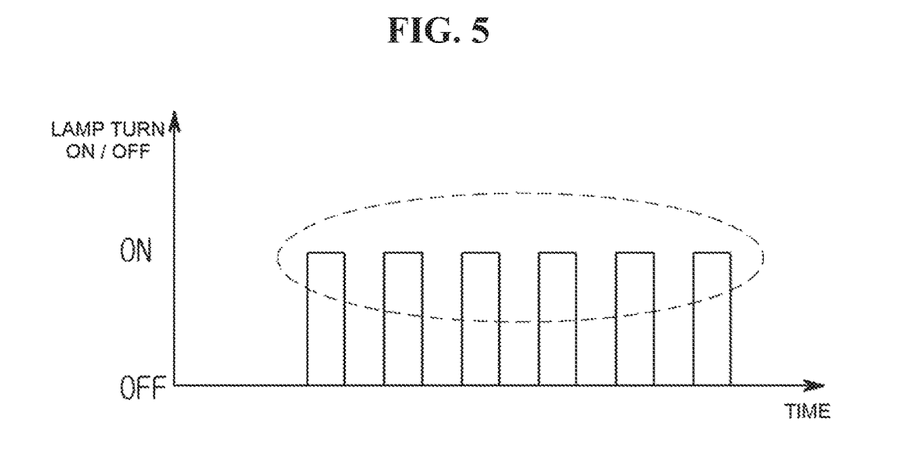
FIG. 5 is a graph showing timing at which the lamp of FIG. 1 is turned on at a predetermined period.

FIG. 5 is a graph showing timing at which the lamp 400 of FIG. 1 is turned on at a predetermined period. At this point, the image processor 200 may determine whether the lamp 400 is broken based on the image that is lightened at a predetermined frequency, in synchronization with the timing at which the lamp 400 is turned on at a predetermined frequency.

The image processor 200 may determine whether the lamp 400 is broken even using the continuous lighting image of the lamp 400 but may determine whether the lamp 400 is broken more reliably by comparing images having a predetermined frequency by turning on the lamp 400 at a predetermined frequency.

Further, there is an advantage in that it is possible to determine whether the lamp 400 is broken by comparing the images having a predetermined frequency even in the daytime.

Figure 6:
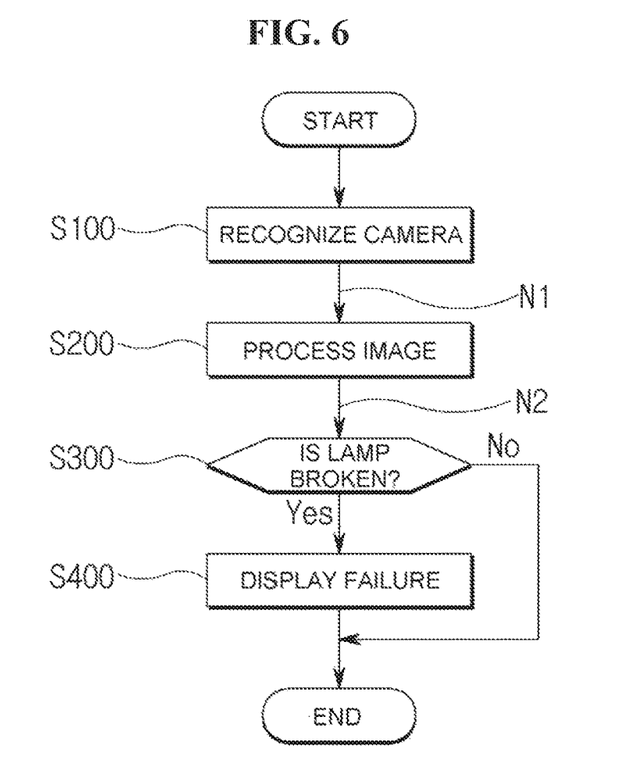
FIG. 6 is a flow chart showing a method for verification of a lamp operation according to another embodiment of the present invention.
Figure 7:
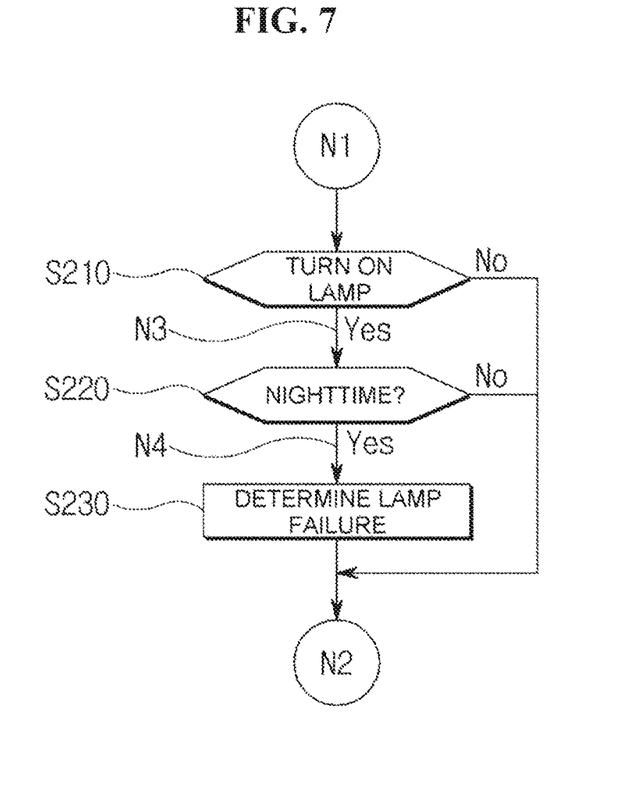
FIG. 7 is a flow chart illustrating in detail an image processing step of FIG. 6.
Figure 8:
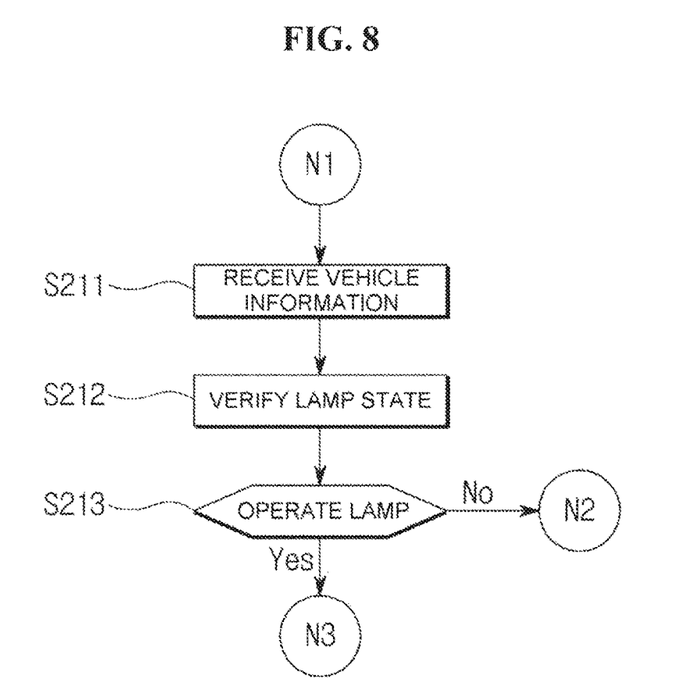
FIG. 8 is a flow chart showing in more detail a lamp turn on verifying step of FIG. 7.
Figure 9:
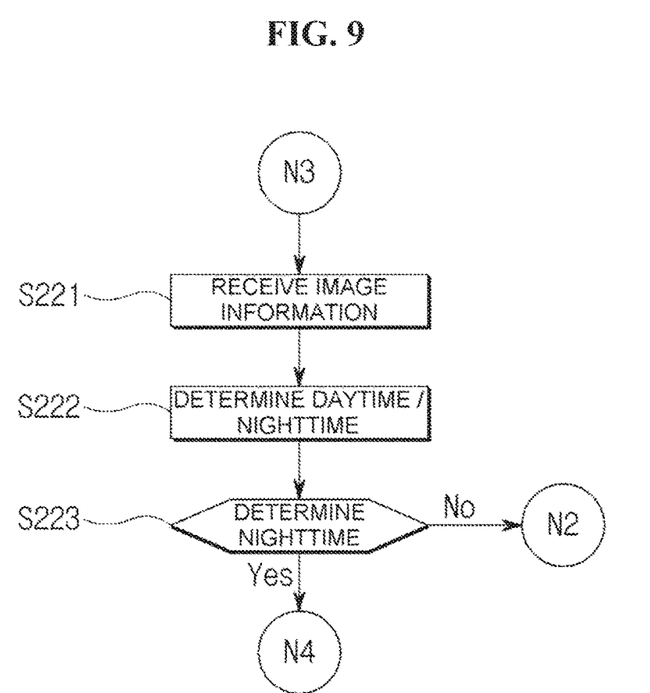
FIG. 9 is a flow chart showing in more detail a nighttime verifying step of FIG. 7.

FIG. 6 is a flow chart illustrating a system for verification of a lamp operation according to another embodiment of the present invention and FIGS. 7 to 9 are flow charts for explaining FIG. 6 in detail.

Hereinafter, the method for verification of a lamp operation according to another embodiment of the present invention will be described with reference to FIGS. 6 to 9.

Referring first to FIG. 6, the method for verification of a lamp operation according to another embodiment of the present invention includes a camera recognizing step of acquiring images around a vehicle (S100) and an image processing step of detecting whether the lamp 400 for illuminating a front or a rear of the vehicle is broken based on the images acquired in the camera recognizing step (S100) (S200).

Here, the image processing step (S200) is performed in synchronization with the timing at which the lamp 400 is turned on, by receiving the turn on state of the lamp 400 through the internal communication of the vehicle connected to the lamp 400.

In addition, the image processing step (S200) may determine whether the lamp 400 is broken based on the image acquired in the camera recognizing step (S100), in synchronization with the turn on of the lamp 400 or the timing at which the lamp 400 is turned on a predetermined frequency.

Specifically, the image processing step (S200) may determine that the lamp 400 is broken if a difference in brightness of areas illuminated by the lamp 400 is equal to or less than a predetermined range, by comparing the images before and after the lamp 400 is turned on.

Further, the method for verification of a lamp operation may include a lamp failure verifying step (S300) of verifying the failure of the lamp 400 based on a result of the image processing step (S200) and a failure displaying step (S400) of displaying the failure of the lamp 400 to the user through the failure display unit 300 if it is verified in the lamp failure verifying step (S300) that the lamp 400 is broken.

That is, the images around the vehicle acquired in the camera recognizing step (S100) are analyzed in the image processing step (S200) to analyze whether the lamp 400 is broken and if it is determined in the lamp failure verifying step (S300) that the lamp is broken, in the failure displaying step (S400), the failure of the lamp 400 is displayed to the user using the failure display unit 300, such that the user may easily recognize the failure of the head lamps and tail lamps.

Further, each of the lamps 400 may be turned on/off at each of predetermined frequencies to be simultaneously analyzed whether any one of the lamps 400 is broken based on different frequencies depending on the left head lamp, the right head lamp, the left tail lamp, and the right tail lamp.

Here, the head lamp may include the fog lamp and the turn signal lamp that are attached to the front surface of the vehicle.

In addition, the tail lamp may include the brake lamp, the turn signal lamp, the back lamp, etc., that are attached to the front surface of the vehicle.

Further, in the camera recognizing step (S100), the images are acquired when the pair of bisymmetrical lamps among the lamps 400, for example, the left and right head lamps or the left and right tail lamps are simultaneously turned on and in the image processing step (S200), the images around the vehicle that are acquired by the camera 100 may be analyzed to analyze whether the lamp 400 is broken based on whether the brightness of areas to which the pair of lamps are illuminated is symmetrical.

FIG. 7 is a flow chart illustrating in detail the image processing step (S200) of FIG. 6. At this point, the image processing step (S200) may include a lamp turn on verifying step (S210) of verifying the lamp state, a nighttime verifying step (S220) of verifying daytime and nighttime, and a lamp failure determining step (S230) of determining the failure of the lamp 400 based on the image acquired by the camera 100.

FIG. 8 is a flow chart showing in more detail the lamp turn on verifying step (S210) of FIG. 7. In this case, the lamp turn on verifying step (S210) may include a vehicle information receiving step (S211) of receiving the vehicle information through the internal communication of the vehicle connected to the lamp 400, a lamp state verifying step (S212) of verifying the lamp state based on the vehicle information, and a lamp operation verifying step (S213) of verifying whether the lamp 400 is operated depending on the lamp state.

FIG. 9 is a flow chart showing in more detail the nighttime verifying step (S220) of FIG. 7. At this point, the nighttime verifying step (S220) includes an image information receiving step (S221) of receiving the image acquired by the camera 100, a daytime and nighttime determining step (S222) of determining nighttime from the image, and a nighttime determining step (S223) of verifying if it is determined that it is nighttime in the daytime and nighttime determining step (S222).

In one or more exemplary embodiments, the described functions may be implemented by hardware, software, firmware, or any combinations thereof. If implemented by software, the functions may be stored or transmitted as one or more commands or codes in a computer-readable medium. The computer-readable medium includes all of communication media and computer storage media including any media that facilitate a transmission of computer programs from one location to another location.

The storage medium may be any available media that may be accessed by a computer. As a non-limitative example, the computer-readable medium may include a RAM, a ROM, an EEPROM, a CD-ROM, or other optical disc storage, a magnetic disc storage or other magnetic storage device, or any other medium that may be used to transfer or store a desired program code in a form of a command or a data structure and is accessible by a computer. Also, any connection is properly referred to as the computer-readable medium.

In the implementation of the software, the techniques described herein may be implemented by modules (e.g., procedures, functions, etc.) that perform the functions described herein. The software codes may be stored in memory units and executed by processors. The memory units may be implemented in processors or outside the processors. In this case, the memory units may communicate with the processors by various means as known.

If implemented by the hardware, the process units may be implemented in one or more ASICs, DSPs, DSPDs, PLDs, FPGAs, processors, controllers, microcontrollers, microprocessors, other electronic units designed to perform the functions described herein, or combinations of them.

The foregoing includes examples of one or more embodiments. Of course, all possible combinations of components or methods for the purpose of describing the embodiments described above are not described, but those skilled in the art may recognize that many combinations and substitutions of various embodiments are possible. Accordingly, the described embodiments are intended to embrace all the alternatives, modifications and variations that fall within the spirit and scope of the appended claims.

Moreover, in connection with the extent that the term "include" in the detailed description or the appended claims is used, the term are intended to be inclusive in a manner similar to "consisting" as interpreted when the term "configured" is used as a transitional word in the appended claim.

As described above, the system and method for verification of a lamp operation according to the present invention are advantageous in that the state of the head lamp and the tail lamp of the vehicle is determined by using the around view camera and when the failure state of the head lamp and the tail lamp of the vehicle is verified by using the around view camera, the failure state is displayed to the user, such that the user may easily recognize the failure of the head lamp and the tail lamp.

What is claimed is:

1. A system for verification of a lamp operation determining whether a lamp illuminating a front or a rear of a vehicle is broken, comprising:
  a camera for acquiring an image around the vehicle; and
  an image processor for determining whether the lamp for illuminating the front or the rear of the vehicle is broken based on the image acquired by the camera, wherein the image processor receives a turn on state of the lamp through internal communication of the vehicle connected to the lamp and is operated in synchronization with timing at which the lamp is turned on, and the image processor determines whether the lamp is broken by comparing images before and after the lamp is turned on if it is determined that the lamp is turned on.

2. The system of claim 1, wherein the image processor compares the images before and after the lamp is turned on to determine that the lamp is broken if a difference in brightness of areas illuminated by the lamp is equal to or less than a predetermined range.

3. The system of claim 1, further comprising:
a failure display unit for notifying a user of a result of the image processor.

4. The system of claim 1, wherein the image processor includes:
a lamp state verifier for verifying a lamp state;
a daytime/nighttime determiner for determining daytime and nighttime; and
a lamp failure determiner for determining the failure of the lamp based on the image acquired by the camera.

5. The system of claim 1, wherein the image processor determines whether a pair of bisymmetrical lamps is broken based on whether brightness of an area to which the pair of bisymmetrical lamps is illuminated is symmetrical, among the images acquired by the camera, if it is determined that the pair of bisymmetrical lamps is turned on.

6. The system of claim 4, wherein the daytime/nighttime determiner determines the daytime/nighttime on the basis of at least one of the internal communication of the vehicle connected to a daytime/nighttime sensor and/or the determination based on the image acquired by the camera.

7. The system of claim 1, wherein all the lamps of the vehicle are turned on using different frequencies, respectively, and
the image processor simultaneously determines whether each of all the lamps is broken based on the image acquired by the camera, in synchronization with timing at which each of all the lamps is turned on at each of the different frequencies through the internal communication of the vehicle.

8. The system of claim 1, wherein the image processor determines whether the lamp is broken based on an image lightened at a predetermined frequency, in synchronization with timing at which the lamp is turned on at a predetermined frequency.

9. A method for verification of a lamp operation determining whether a lamp illuminating a front or a rear of a vehicle is broken, comprising:
camera recognizing step of acquiring an image around a vehicle; and
an image processing step of detecting whether the lamp for illuminating a front or a rear of the vehicle is broken based on the image acquired in the camera recognizing step, wherein the image processing step is performed in synchronization with timing at which the lamp is turned on, by receiving a turn on state of the lamp through the internal communication of the vehicle connected to the lamp, and the image processing step is performed to determine whether the lamp is broken by comparing images before and after the lamp is turned on if it is determined that the lamp is turned on.

10. The method of claim 9, wherein the image processing step compares the images before and after the lamp is turned on to determine that the lamp is broken if a difference in brightness of areas illuminated by the lamp is equal to or less than a predetermined range.

11. The method of claim 9, wherein all the lamps of the vehicle are turned on using different frequencies, respectively, and
the image processing step simultaneously detects whether each of all the lamps is broken based on the image acquired in the camera recognizing step, in synchronization with timing at which each of all the lamps is turned on at each of the different frequencies through the internal communication of the vehicle.

12. The method of claim 9, further comprising:
a lamp failure verifying step of verifying the failure of the lamp based on a result of the image processing step; and
a failure displaying step of displaying the failure of the lamp to a user through a failure display unit if it is determined in the lamp failure verifying step that the lamp is broken.

13. The method of claim 9, wherein the image processing step includes:
a lamp turn on verifying step of verifying a lamp state;
a nighttime verifying step of determining daytime and nighttime; and
a lamp failure determining step of determining the failure of the lamp based on the image acquired by the camera.

14. The method of claim 9, wherein the image processing step is performed to determine whether a pair of bisymmetrical lamps is broken based on whether brightness of an area to which the pair of bisymmetrical lamps is illuminated is symmetrical, among the images acquired by the camera, if it is determined that the pair of bisymmetrical lamps is turned on.

15. The method of claim 13, wherein the nighttime verifying step includes
an image information receiving step of receiving an image acquired by the camera;
a daytime/nighttime determining step of determining nighttime from the image; and
a nighttime determination verifying step of verifying whether it is nighttime in the daytime/nighttime determining step.

* * * * *